March 1, 1966   J. F. HUTCHINSON   3,237,670
ANTI-SKID TIRE AND APPARATUS FOR MANUFACTURING THE SAME
Filed Dec. 12, 1963
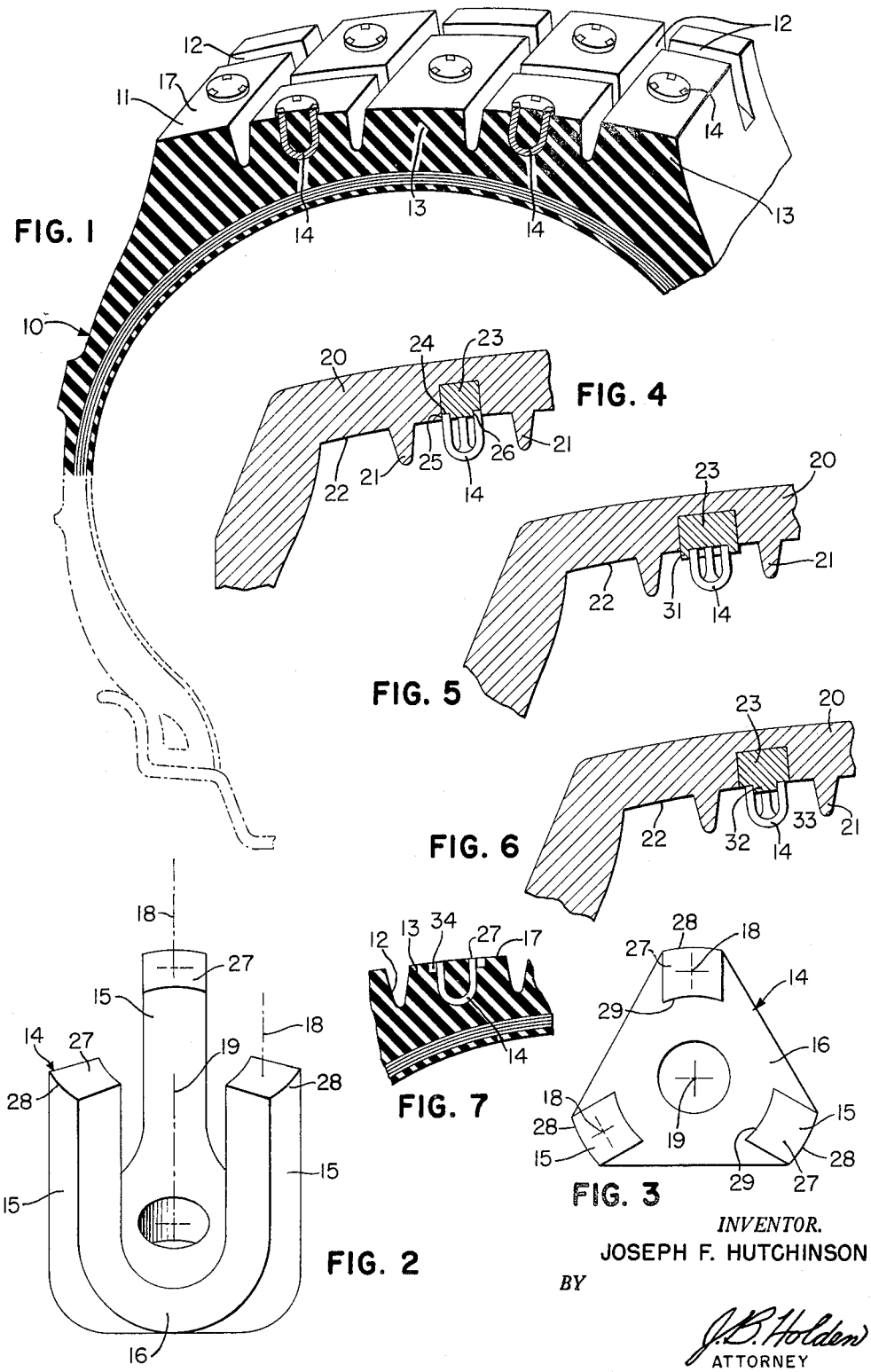
INVENTOR.
JOSEPH F. HUTCHINSON
BY
J. B. Holden
ATTORNEY United States Patent Office 3,237,670
Patented Mar. 1, 1966

3,237,670
ANTI-SKID TIRE AND APPARATUS FOR
MANUFACTURING THE SAME
Joseph F. Hutchinson, Akron, Ohio, assignor to The Goodyear Tire & Rubber Company, Akron, Ohio, a corporation of Ohio
Filed Dec. 12, 1963, Ser. No. 330,118
6 Claims. (Cl. 152—211)

This invention relates to an anti-skid tire having metal traction inserts embedded in the tread thereof and an apparatus for manufacturing tires and, more particularly, but not exclusively, to a tire having rubber tread elements which are, at least in part, in the form of lugs.

It has long been recognized that there is a definite need for traction members and inserts made of metal, particularly for automobile tires, which are constructed to provide adequate traction on icy road surfaces, or during other weather conditions when conventional tires fail to grip the road surface. Various types of tire constructions have been proposed, some of which have elongated wire coils, wire mesh, or an abrasive material embedded in the tread rubber. Each of these means for increasing traction are advantageous but each has its disadvantages which makes the use thereof unfeasible. For example, wire coils require a certain "wearing in" period prior to the peak road gripping efficiency. Wire mesh is satisfactory but it is particularly difficult to disperse it uniformly throughout the depth of the tread. Individually spaced or isolated inserts, on the other hand, require a considerable amount of labor to be properly positioned and incorporated into the tread, particularly in a lug type tire.

It is an object of this invention to provide an improved anti-skid tire construction having traction augmenting members or inserts therein which are isolated from each other and which provide a large number of traction augmenting inserts at the tread surface while at the same time insuring that the inserts remain in the tire for the complete life of the tread.

Another object of this invention is to provide an anti-skid tire construction having a tread which is at least in part made of lugs having embedded in each lug a traction augmenting insert, the invention including an apparatus for manufacturing and/or recapping such a tire.

Other objects and advantages of this invention will become apparent when read in conjunction with the accompanying drawings and the following specification, in which FIG. 1 is an isometric view of a tire with parts broken away and in cross section showing the preferred construction of the invention;

FIG. 2 is an isometric view of the metal traction insert of this invention;

FIG. 3 is a plan view of the metal traction insert of this invention;

FIG. 4 is a cross-sectional view of the apparatus of this invention;

FIGS. 5 and 6 are modifications of the apparatus of this invention, and

FIG. 7 is a partial cross-sectional view of a tire of this invention made by the apparatus of FIG. 5.

Referring to the drawings, numeral 10 indicates a tire having a tread 11 which for the purpose of illustrating the invention is provided with a plurality of grooves 12 extending both transversely and longitudinally of the tread and forming a plurality of isolated intervening lugs 13. It is understood that the invention is applicable to a tire having any tread design but the invention is particularly adaptable to tires having a tread surface which in part at least includes a number of lugs.

A traction augmenting insert or stud 14 is embedded in each of the lugs 13 and is substantially the same length as the depth of the grooves 12 so that the insert will be fully effective to increase traction of the tire on ice and wet surfaces during the complete tread life of the tire.

Referring to FIGS. 2 and 3, the insert 14 is made of metal such as steel, tungsten carbide, and the like, and consists of a plurality of teeth 15 integrally joined to an arcuate base 16 with the teeth 15 extending parallel to each other from the base 16. The teeth 15 extend normal to the tread surface 17 of the lugs 13. The teeth 15 are rigid and have a thickness of about one-sixteenth of an inch. The inserts 14 are provided with three teeth 15 which extend parallel to each other from the base 16 although a greater number of teeth may be provided. Preferably, the length of the teeth is substantially greater than the distance between the axial centerlines 18 of each of the teeth. The maximum dimension of the cross section of the teeth is small in comparison to the length of the teeth and, preferably, less than 20 percent of the length. The cross section of each of the teeth 15 normal to the centerline thereof is symmetrical with the centerline 18 of the teeth and in addition the axial centerlines 18 of each of the teeth 15 are preferably equiangularly spaced about and disposed equidistantly relative to the longitudinal centerline 19 of the insert 14.

Referring to FIG. 4 of the drawings, a tread-forming mold section 20 is shown having suitable projections 21 to form the grooves 12 in the tire. The mold section 20 forms part of a cylindrical tire mold body. The projections 21 define lug or rib forming recesses having a base surface 22 which forms the tread surface 17 of the lug or rib 13. Some or all of the surfaces 22 of the mold 20 are provided with a permanent magnet 23 to provide a field of magnet attraction within the recesses formed by the projections 21. In addition, as shown in FIG. 4, the surface 22 is provided with an annular recess 24 forming concentric shoulders 25 and 26. When making the tire, a plurality of inserts 14 are positioned within each of the lug-forming recesses of the mold 20 so that the extreme outer ends 27 of the inserts 14 are positioned with the edge 28 of the teeth 15 engaging the shoulder 25, and the edge 29 of the teeth 15 engaging the shoulder 26 in the mold. Thus, the insert 14 is positioned in the mold with each of the teeth 15 extending normal to the tread surface and with the insert spaced laterally from the projections 21 of the mold. The magnetic field of the magnets 23 hold the inserts 14 against the surface 22. A tire having an unvulcanized tread is placed in the mold and under the influence of heat and pressure the rubber of the tread portion will be caused to flow in and around the metallic inserts 14 so as to cause them to become embedded in the rubber of the tread portion. During the tread-forming operation the shoulders 25 and 26 prevent the insert 14 from shifting laterally toward the projections 21. The inserts are thereby molded integrally with the lugs 13 with the teeth normal to the surface 17.

In another form of the invention, the tread surface 17 of each of the lugs 13 is provided with an annular disc-shaped projection extending slightly above the tread surface 17. The shoulders 26 are eliminated from the mold so that the extreme outboard ends 27 of each insert are positioned only against shoulders 25 of the mold. The recess 24 in the mold is in the form of a cylinder.

FIG. 5 of the drawings is a modification of FIG. 4 in which the insert 14 is molded flush with the tread-forming surface 22 and an annular projection 31 is provided in the surface 22 which engages the surface 28 of the insert 14 to initially position the insert and to prevent it from moving laterally during the molding operation.

In FIG. 6 of the drawings the surface 22 of the mold is provided with a projection 32 which engages the surface 29 of the insert 14 and forms a recess 33 in the outer surface of the tire tread centrally of the insert 14.

FIG. 7 of the drawings shows a tire having a lug 13 molded by the apparatus shown in FIG. 5. The insert 14 is positioned within the lug so that the surface 27 thereof is flush with the lug surface 17 and a groove 34 is provided adjacent the surface 28 of the insert.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a carcass, a rubber tread portion integral with said carcass, said tread portion having a plurality of grooves in its radially outer surface defining traction members, and a plurality of discrete metallic anti-skid studs each embedded within one of said traction members, said studs being spaced apart from each other and from said carcass a substantial distance, each stud having an anchoring base portion extending generally laterally of said tread portion and having a central opening filled with rubber of said tread portion, each stud further having at least one elongated portion having a length substantially greater than the diameter of said base and a diameter substantially less than that of said base, said elongated portion extending integrally from said base outwardly of the tire and terminating at an outer end providing a traction implementing surface closely adjacent said outer surface of the tread, at least a portion of the side of said elongated portion being exposed at the outer end thereof.

2. A tire having a carcass, a rubber tread portion integral with said carcass, said tread portion having a plurality of grooves in its radially outer surface defining traction members and a plurality of discrete metallic anti-skid studs each molded within one of said traction members, said studs being spaced from each other and from said carcass a substantial distance, each stud having a base portion having a central opening filled with rubber of said tread portion, each stud further having a plurality of elongated teeth extending from said base toward said outer surface of the tread and terminating in at least partially exposed discrete traction implementing elements spaced apart about the axis of said opening.

3. A tire having a carcass, a rubber tread portion integral with said carcass, said tread portion having a plurality of grooves in its radially outer surface defining traction members and a plurality of discrete one-piece metallic anti-skid studs each molded within one of said traction members each stud including a base having a central opening filled with rubber of said tread portion, each stud further having a plurality of elongated teeth extending from said base toward said outer surface, said teeth of each stud being equiangularly spaced about and disposed equidistantly from the axis of said central opening and terminating at their outer ends closely adjacent said outer surface of said tread in position for contact with the ground, said studs being spaced from each other and from said carcass a substantial distance.

4. A tire having a carcass, a rubber tread portion integral with said carcass, said tread portion having a plurality of grooves in its radially outer surface defining traction members, said traction members being provided with a plurality of discrete spaced apart molded projections extending outwardly of and from said outer surface and being circular in plan, and a plurality of anti-skid studs respectively associated with said projections, each of said studs being embedded within said tread portion in spaced relation to said carcass and being disposed coaxially of the respectively associated projection, each stud comprising a base portion and a plurality of elongated teeth extending from said base portion outwardly of said tread portion and into the respective projection, said teeth being equiangularly spaced about the central axis of said projection and having surfaces lying in the general plane of the side of said projection, whereby at least a portion of each tooth is exposed.

5. A tire having a carcass, a rubber tread portion integral with said carcass, said tread portion having a plurality of grooves in its radially outer surface defining traction members, and a plurality of discrete unconnected metallic anti-skid studs molded into said traction members in substantially spaced relation to each other and to said carcass, each stud comprising a base portion and a plurality of integral elongated teeth extending from the base toward said outer surface, said base having a central opening filled with the rubber of said tread portion, said teeth being spaced apart equiangularly about and equidistant from the axis of said opening, said outer tread surface being provided with a plurality of recesses respectively associated with said studs and each disposed coaxially of said opening in the respectively associated stud base, the teeth of each stud having surfaces lying in the general plane of a side wall of the respective recess.

6. A tire as described in claim 5 in which each of said recesses is annular, and the teeth of the respective stud lie in part in the general plane of the inner diameter side wall of each respectively associated annular recess, the remainder of each stud other than the distal end faces of said teeth being embedded in said tread portion.

References Cited by the Examiner

UNITED STATES PATENTS

| | | | |
|---|---|---|---|
| 1,163,518 | 12/1915 | Farr | 152—169 |
| 1,759,590 | 5/1930 | Peters | 152—211 |
| 2,121,956 | 6/1938 | Eger | 152—211 |
| 2,511,690 | 6/1950 | Bergen | 152—211 |
| 2,557,945 | 6/1951 | Crooker | 152—211 |
| 2,587,297 | 2/1952 | Duerksen | 18—44 |
| 2,848,744 | 8/1958 | Crooker | 18—44 |

FOREIGN PATENTS

| | | |
|---|---|---|
| 402,419 | 10/1909 | France. |
| 1,171,675 | 10/1958 | France. |

ARTHUR L. LA POINT, *Primary Examiner.*